United States Patent
Balannik et al.

(10) Patent No.: US 10,484,536 B2
(45) Date of Patent: Nov. 19, 2019

(54) METHODS AND APPARATUS TO ASSOCIATE VOICE MESSAGES WITH MISSED CALLS

(75) Inventors: Vadim Balannik, Arlington Heights, IL (US); Patrick Dell Ellis, Lake in the Hills, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/235,015

(22) Filed: Sep. 16, 2011

(65) Prior Publication Data

US 2013/0072164 A1    Mar. 21, 2013

(51) Int. Cl.
*H04M 3/48* (2006.01)
*H04M 3/533* (2006.01)
*H04M 3/537* (2006.01)

(52) U.S. Cl.
CPC .............. *H04M 3/48* (2013.01); *H04M 3/537* (2013.01); *H04M 3/53333* (2013.01); *H04M 2203/551* (2013.01); *H04M 2250/60* (2013.01)

(58) Field of Classification Search
CPC ..................................................... H04W 4/12
USPC ................... 455/412.1, 412.2, 413
See application file for complete search history.

(56) References Cited

U.S. PATENT DOCUMENTS

| | | | |
|---|---|---|---|
| 5,283,818 A | 2/1994 | Klausner et al. | |
| 5,390,236 A | 2/1995 | Klausner et al. | |
| 5,572,576 A | 11/1996 | Klausner et al. | |
| 6,091,947 A * | 7/2000 | Sumner | H04W 4/12 455/413 |
| 8,005,461 B2 * | 8/2011 | Vander Veen | H04M 1/7255 379/88.11 |
| 8,249,568 B2 * | 8/2012 | Salmon | H04M 1/7255 379/1.02 |
| 2002/0183044 A1 * | 12/2002 | Blackwell | G06Q 10/107 455/412.1 |
| 2003/0228863 A1 * | 12/2003 | Vander Veen | H04M 1/7255 455/412.1 |
| 2004/0023643 A1 * | 2/2004 | Vander Veen | H04M 1/7255 455/413 |
| 2006/0227956 A1 | 10/2006 | Pearson | |
| 2007/0280457 A1 | 12/2007 | Aberethy et al. | |
| 2008/0056459 A1 * | 3/2008 | Vallier | H04L 29/06027 379/88.12 |

(Continued)

FOREIGN PATENT DOCUMENTS

| | | |
|---|---|---|
| WO | 2005027485 | 3/2005 |
| WO | 2008042300 | 4/2008 |

OTHER PUBLICATIONS

European Examination Report dated Dec. 22, 2016, received for European Application No. 11190390.2.

(Continued)

*Primary Examiner* — Charles N Appiah
*Assistant Examiner* — Frank E Donado
(74) *Attorney, Agent, or Firm* — Donna Flores; Fleit Intellectual Property Law (57) ABSTRACT

Methods and apparatus to associated voice messages with missed calls are disclosed. One example method includes receiving at a mobile device a call log item, obtaining a caller identity and a call log item time stamp, and determining if a voice message is associated with the call log item based on a voice message time stamp, the call log item time stamp, and a message duration. Other embodiments are described.

15 Claims, 6 Drawing Sheets

(56) References Cited

U.S. PATENT DOCUMENTS

| | | | |
|---|---|---|---|
| 2008/0167014 A1* | 7/2008 | Novick | H04M 3/53333 455/413 |
| 2008/0207176 A1 | 8/2008 | Brackbill et al. | |
| 2011/0013756 A1* | 1/2011 | Davies | G10L 15/22 379/88.14 |
| 2011/0087972 A1* | 4/2011 | Swink | H04L 51/32 715/752 |
| 2011/0151850 A1* | 6/2011 | Haaparanta | H04M 1/2745 455/415 |
| 2013/0005305 A1* | 1/2013 | Lerda | H04M 3/53325 455/412.2 |

OTHER PUBLICATIONS

Danielsen, P., "Absence Services", Bell Labs Technical Journal, Jun. 2008, pp. 1-6, vol. 13, No. 2.
European examination report dated Nov. 6, 2017 issued for European Application No. 11190390.2.
European examination report dated Oct. 18, 2018 issued for European Application No. 11190390.2.
Summons to attend oral proceedings pursuant to Rule 115(1)EPC, for European Patent Application No. 11190390.2 dated Jul. 2, 2019.

\* cited by examiner

METHODS AND APPARATUS TO ASSOCIATE VOICE MESSAGES WITH MISSED CALLS

FIELD OF THE DISCLOSURE

The present disclosure relates generally to communications and, more particularly, to methods and apparatus to associate voice messages with missed calls.

BACKGROUND

Voice messages, such as voicemail messages, are typically left for a call recipient when the recipient does not answer his or her telephone. In such situations, voicemail messages are left by a caller more or less in real time with placing a call to the call recipient. Sometime later, the call recipient may receive an indication that a caller left a voice message. Call logs are lists tracking incoming and outgoing calls at a mobile device.

DETAILED DESCRIPTION

Although the following discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, apparatus, and articles of manufacture, persons having ordinary skill in the art will readily appreciate that the examples provided are not the only way to implement such methods, apparatus, and articles of manufacture.

For simplicity and clarity of illustration, where considered appropriate, reference numerals may be repeated among the figures to indicate corresponding or analogous elements. In addition, numerous specific details are set forth in order to provide a thorough understanding of examples disclosed herein. However, those of ordinary skill in the art will understand that the examples disclosed herein may be practiced without these specific details. In other instances, well-known methods, procedures, and components have not been described in detail so as not to obscure examples disclosed herein. Also, the description is not to be considered as limiting the scope of examples disclosed herein.

Example methods, apparatus, and articles of manufacture disclosed herein may be used in connection with telephony-capable mobile devices, which may be any mobile communication device, mobile computing device, or any other element, entity, device, or service capable of communicating wirelessly. Mobile devices, also referred to as terminals, wireless terminals, mobile stations, communication stations, user equipment (UE), or user devices, may include mobile smart phones, cellular telephones, wireless personal digital assistants (PDA), tablet/laptop/notebook/netbook computers with wireless adapters, etc. Example methods, apparatus, and articles of manufacture disclosed herein facilitate operations in a mobile device to associate voice messages with missed calls. One example method includes receiving at a mobile device a call log item, obtaining a caller identity and a call log item time stamp, and determining if a voice message is associated with the call log item based on a voice message time stamp, the call log item time stamp, and a message duration. In some examples, determining if a voice message is associated with the call log item is further based upon the caller identity. The message duration may be a duration of an outgoing message or an incoming message. Determining if a voice message is associated with the call log item may be based upon a latency time and may also include determining if the call log item is a missed call. The method may also include providing a user interface indication in a call log that a voice message is associated with the call log item.

Figure 1:
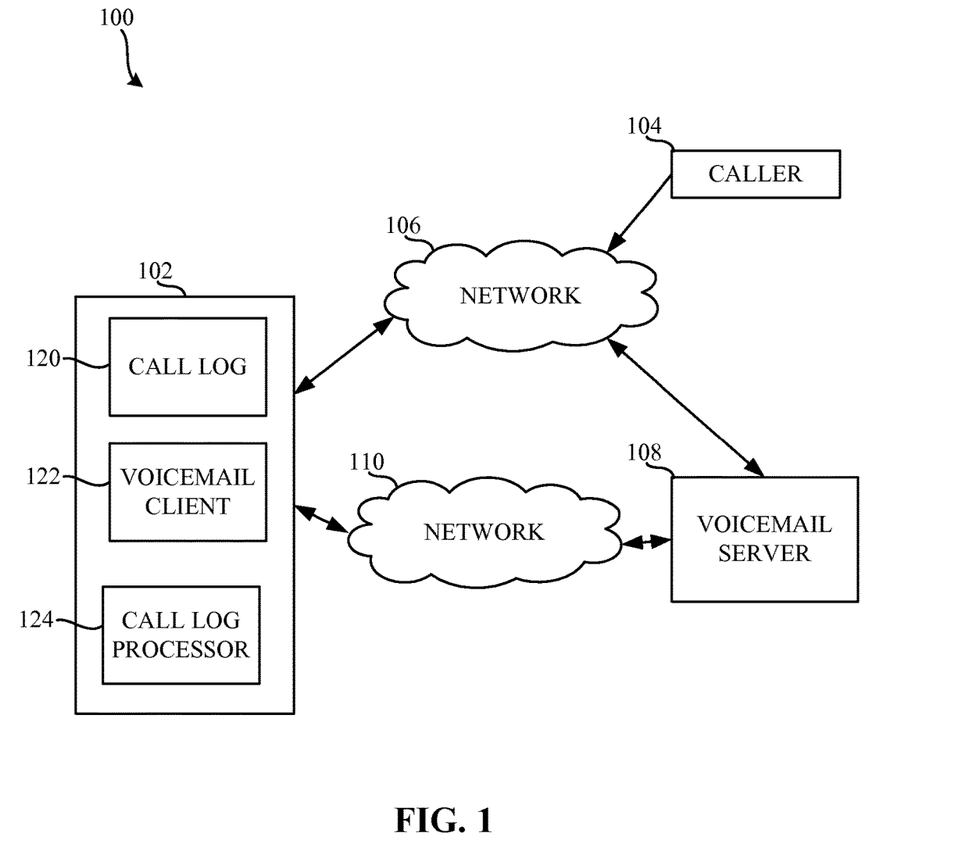
FIG. 1 depicts an example system for associating voice messages with missed calls.

As shown in FIG. 1, a communication system 100 includes a mobile device 102 that may receive a telephone call from a caller 104 through a network 106. In the event that the mobile device 102 does not answer the telephone call, the network 106 routes the caller 104 to a voicemail server 108 so that the caller may leave a voice message for the user of the mobile device 102. The voicemail server 108 provides an indication to the mobile device 102, via a network 110, that a voice message has been left on the voicemail server 108 for the mobile device 102.

In the example of FIG. 1, the mobile device 102 includes, among other things, a call log 120, a voicemail client 122, and a call log processor 124. In practice, the mobile device 102 may be implemented using a mobile telephone, a smartphone, a tablet computer, or any suitable device. The call log 120, the voicemail client 122, and the call log processor 124 may be implemented using hardware, software, firmware, coding, or any other suitable logic to facilitate the functionality described herein. Although not pictured in FIG. 1 for the sake of clarity, the mobile device 102 may include other functionality, such as wireless communication functionality, etc. The mobile device 102 is configured to communicate with the caller 104 and/or the voicemail server 108, as well as the networks 106, 110 and any other suitable networks (e.g., cellular networks, local area networks, etc.).

The network 106 may be any communication network that facilitates voice communication between the caller 104 and the mobile device 102. For example, the network 106 may include landline telephone networks, cellular networks, public or private networks, the Internet, or any suitable combination thereof. Additionally, the network 106 may be a data network that facilitates voice communication between the caller 104 and the mobile device 102 through digital communication.

The voicemail server 108 of the example of FIG. 1 may be implemented using a visual voicemail system that provides voicemail functionality to the mobile device 102 without the mobile device 102 having to call the voicemail server 108. Instead, the interface between the mobile device 102 and the voicemail server 108 may be a data connection whereby voicemail information may be provided from the voicemail server 108 to the voicemail client 122 of the mobile device 102 without the mobile device 102 having to place a telephone call to the voicemail server 108.

The network 110 may be any communication network that facilitates communication between the voicemail server 108 and the mobile device 102. For example, the network 110 may include a digital cellular network, landline telephone networks, public or private networks, the Internet, or any suitable combination thereof.

In the example of FIG. 1, when the mobile device 102 receives a call or makes a call, an indication of the same is maintained in the call log 120. Accordingly, when the mobile device 102 does not answer a call from the caller 104, an indication of a missed call is placed in the call log 120.

Figure 2:
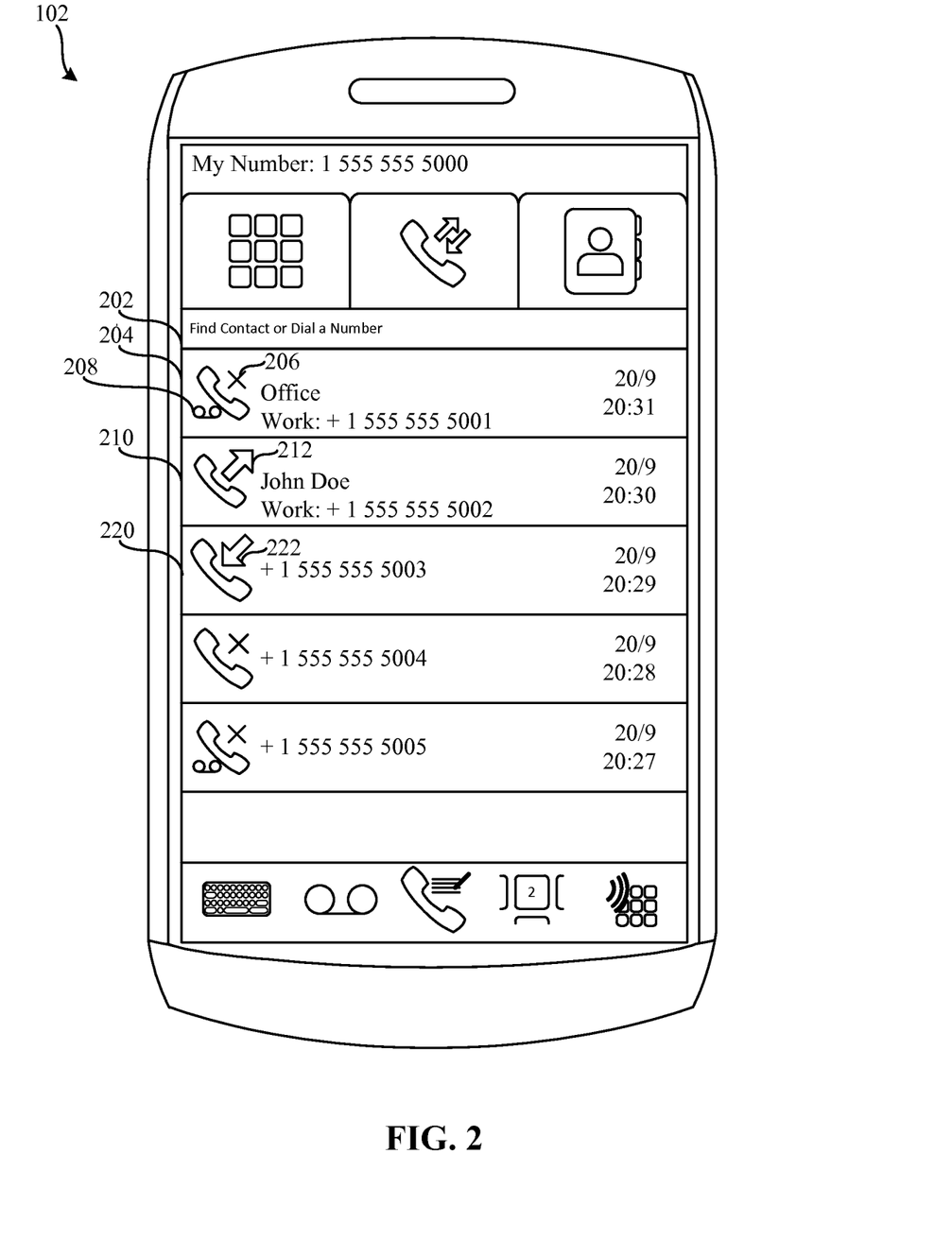
FIG. 2 depicts a user interface showing a call log including indications of call log entries having associated voice messages.
Figure 3:
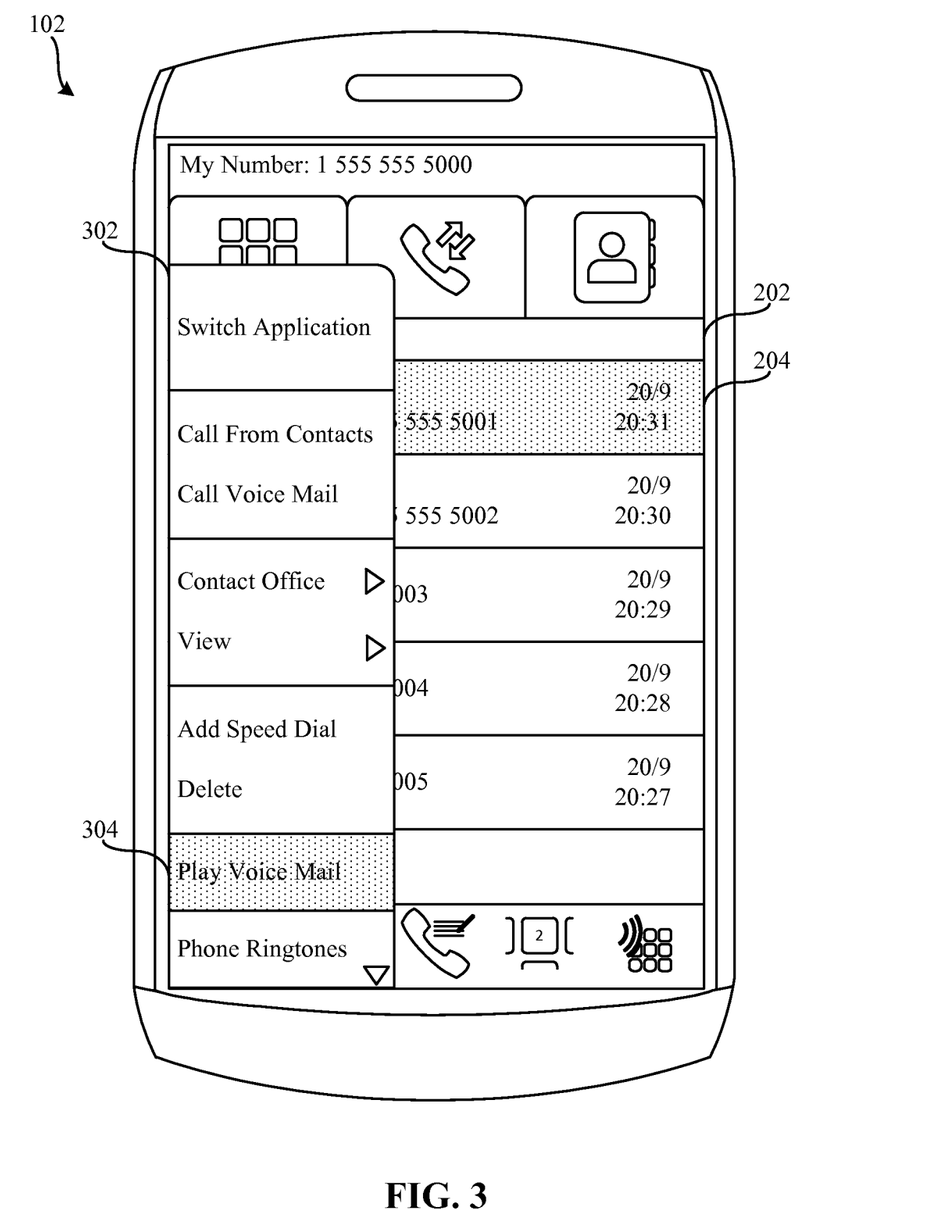
FIG. 3 depicts the user interface of FIG. 2 including a menu associated with a call log entry having an associated voice message.

The call log 120 may be implemented using software executed by the mobile device 102 to maintain a listing of incoming and outgoing communications. For example, the call log 120 may track dates, times, and durations of incoming calls and outgoing calls, and may also track the dates and times of missed calls (e.g., calls that were not answered at the mobile device 102). In other implementations, the call log 120 may be implemented using hardware or any suitable combination of hardware and software. Further detail regarding a user interface to the call log 122 is shown in FIGS. 2 and 3.

The voicemail client 122 may be implemented using software executed by the mobile device 102 to allow the mobile device 102 to interface with the voicemail server 108. In this manner, the mobile device 102 may obtain voicemail from the voicemail server 108. In other implementations, the voicemail client 122 may be implemented using hardware or any suitable combination of hardware and software.

Although a single voicemail client 122 is shown in FIG. 1, the mobile device 102 may include multiple voicemail clients, each of which facilitates user interaction with voice messages associated with a voicemail server or voicemail servers. For example, the mobile device 102 may include a first voicemail client associated with a voicemail server of a network carrier that provides network connectivity to mobile device 102, a second voicemail client associated with a voicemail server of another entity (e.g., a voicemail server associated with an office or any other enterprise), and a third voicemail client associated with any other voicemail server (e.g., a voicemail server associated with a subscription service). Alternatively, rather than the mobile device 102 including multiple voicemail clients, the voicemail client 122 may be configured to support multiple voicemail servers and to facilitate user interaction with numerous voicemail servers. In such a case, the voicemail client 122 may include an account for each respective voicemail server to which the user has access. In either of these manners, the mobile device 102 may provide a user interface to visual voicemail (or any other voicemail) from numerous different sources.

As described herein, the mobile device 102 includes the call log processor 124, which may be implemented using any combination of software and/or hardware, that facilitates the association of voice messages with missed calls. Thus, the call log processor 124 accesses the call log 120 and the voicemail client 122 to determine if voice messages are associated with missed calls and reflects those associated voice messages in the call log 120. Accordingly, the call log 120 of the mobile device 102, in addition to including a list of calls, may also include an indication of calls having associated voice messages. For example, if the caller 104 made a call to the mobile device 102 that was unanswered, and the caller 104 left a voice message for the mobile device 102 on the voicemail server 108, the call log processor 124 would determine this fact and the call log 120 of the mobile device 102 would include an indication signifying that a voice message was received in association with the missed call from the caller 104.

Although shown as separate blocks in the example of FIG. 1, the call log 120, the voicemail client 122, and the caller log processor 124 may be integrated into a single software or hardware component. Additionally, the functionality associated with the call log processor 124 may be implemented within the call log 120 or the voicemail client 122.

FIG. 2 shows further detail of the mobile device 102 including a user interface presenting a call log 202 including five entries. A first entry 204 in the call log 202 indicates that a call from the telephone number 555-555-5001 was received on September 9 at 8:31 PM. The X graphic 206 is used as an indication that the call was not answered and, therefore, the call was a missed call. Additionally, a voicemail graphic 208 is shown in the first entry 204 of the call log 202. The voicemail graphic 208 indicates that there is a voicemail associated with the first entry 204 and the call log 202. A second entry 210 of the call log 202 includes an outgoing arrow 212 indicating that that a call was made to John Doe at 555-555-5002 at 8:30 PM on September 9. A third entry 220 of the call log 202 includes an incoming arrow 222 indicating that a call was received from 555-555-5003 on September 9 at 8:29 PM.

Of interest in FIG. 2 is the voicemail graphic 208, which appears in the call log 202. An example process used to determine if a voice message is associated with a call, for example, a missed call, is described below. As explained in detail below, comparison of voice message and call log timestamps, along with message duration information may be used to reliably determine if a voice message is associated with a call log entry.

As shown in FIG. 3, selection of the first entry 204 of the call log 202 results in presentation of a menu 302. The menu 303 includes various options associated with the first entry 204 of the call log 202. Of particular interest in the menu 302 is a play voicemail option 304, selection of which will play a voice message associated with the first entry 204 of the call log 202. Accordingly, once it is determined that a voice message is associated with the call in the call log 202, the user interface presented to a user may be enhanced to provide functionality recognizing the presence of an associated voice message.

Figure 4:
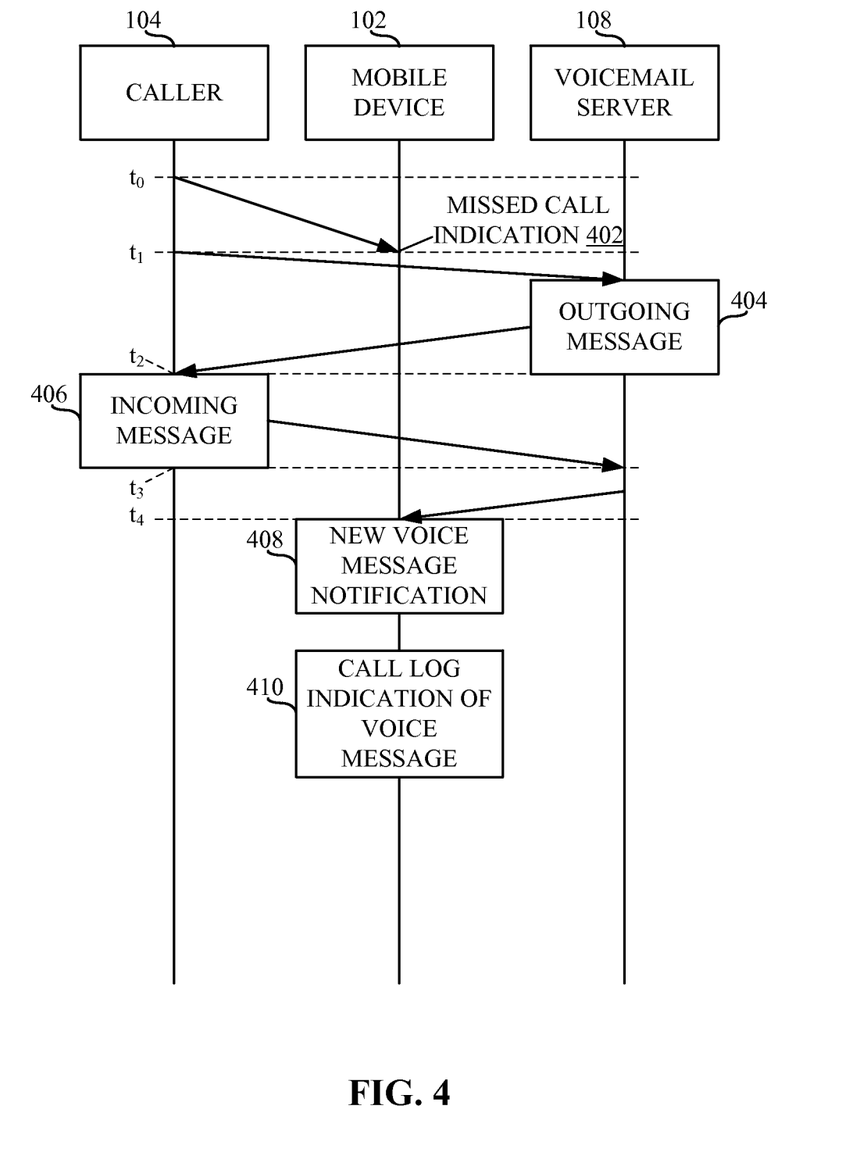
FIG. 4 is an example diagram illustrating events that take place between a caller, a mobile device, and a voicemail server.

FIG. 4 shows a communication flow between the mobile device 102, the caller 104, and the voicemail server 108. In particular, FIG. 4 shows latency times in the process of the caller 104 making a call that rolled to the voicemail server 108, at which point the caller 104 heard an outgoing message from the voice mail server and left an incoming message for the voice mail server. These latency times may be considered when making an association between a voice message and a missed call, as described below.

At time $t_0$, the caller 104 makes a call to the mobile device 102. The mobile device 102 may ring for a preset number of times (e.g., 3 rings, 5 rings, etc.). If the mobile device 102 does not answer the call within the preset number of rings, at $t_1$ a missed call indication 402 is made at the mobile device 102. At or about the same time, the caller 104 is transferred by a communication network (e.g., the network 106) to the voicemail server 108, at which point an outgoing message 404 is played for the caller 104 to hear. The outgoing message 404 occupies a time roughly between $t_1$ and $t_2$.

After the caller 104 hears the outgoing message 404, the caller 104, at time $t_2$ begins leaving an incoming message 406 on the voicemail server 108. The incoming message 406 occupies time $t_2$ to $t_3$. After the conclusion of the incoming message 406, which occurs at $t_3$, the voicemail server 108 provides a new voice message notification 408 to the mobile device 102 at $t_4$. Subsequently, the mobile device 102 associates the voice message with the missed call and provides a call log indication of the voice message in association with the missed call 410.

Accordingly, as shown in FIG. 4, time $t_1$ to time $t_4$ is the time difference between the mobile device 102 obtaining the missed call indication 402 and the mobile device 102 receiving the new voice message notification 408. The time $t_1$ to time $t_3$ is essentially the duration of the outgoing message 404 and the incoming message 406. Additionally, the time between $t_3$ and $t_4$ is a latency time during which the voicemail server 108 notifies the mobile device 102 of the new voice message. As described below, the duration of the messages 404 and/or 406, along with latency times may be used to associate voice messages with the missed calls. For most service carriers, the visual voicemail client (e.g., the voicemail client) knows the duration of the outgoing message 404. In some instances, if the duration of the outgoing message 404 is now known, the maximum length of the outgoing message 404 is known. Once the mobile device 102 receives the incoming message 406, the mobile device 102 knows the duration of the incoming message 406. One manner in which the mobile device 102 can associate voice messages with missed calls is shown in FIG. 5.

Figure 5:
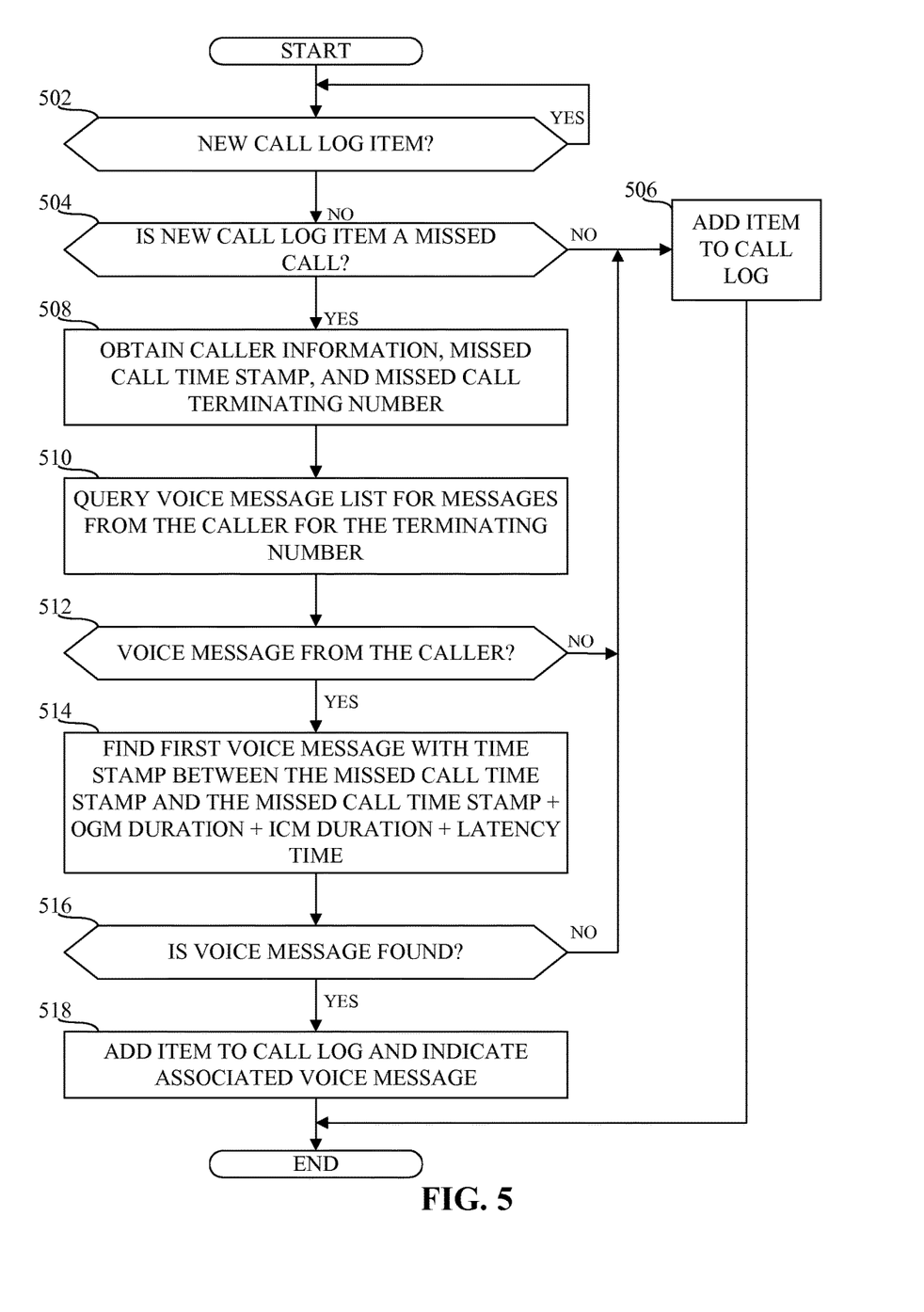
FIG. 5 is an example flow diagram representative of a process, which may be implemented using computer readable instructions on a mobile device that may be used to associate voice messages with missed calls.

FIG. 5 depicts an example flow diagram representative of a process that may be implemented using, for example, computer-readable instructions stored on a computer-readable medium to associate voice messages with missed calls. The example process of FIG. 5 may be performed using one or more processors, controllers, and/or any other suitable processing devices. For example, the example process of FIG. 5 may be implemented using coded instructions (e.g., computer readable instructions) stored on one or more tangible computer readable media such as flash memory, read-only memory (ROM), and/or random-access memory (RAM), such as may be found in the mobile device 102 of FIG. 1.

As used herein, the term tangible computer readable medium is expressly defined to include any type of computer readable storage. Additionally or alternatively, the example process of FIG. 5 may be implemented using coded instructions (e.g., computer-readable instructions or machine-accessible instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information).

As used herein, the term non-transitory computer-readable medium and non-transitory machine-accessible medium are expressly defined to include any type of computer-readable medium or machine-accessible medium.

Alternatively, some or all operations of the example process of FIG. 5 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all operations of the example process of FIG. 5 may be implemented manually or as any combination(s) of any of the foregoing techniques, for example, any combination of firmware, software, discrete logic, and/or hardware. Further, although the example process of FIG. 5 is described with reference to the flow diagram of FIG. 5, other methods of implementing the process of FIG. 5 may be employed. For example, the order of execution of the blocks may be changed, and/or some of the blocks described may be changed, eliminated, subdivided, or combined. Additionally, any or all operations of the example process of FIG. 5 may be performed sequentially and/or in parallel by, for example, separate processing threads, processors, devices, discrete logic, circuits, etc.

In the illustrated example, the process of FIG. 5 is described below as performed by the mobile device 102 of FIG. 1. However, the example process of FIG. 5 may additionally or alternatively be implemented using any other suitable device or apparatus.

Now turning to FIG. 5, an example process to associate voice messages with missed calls is shown. The process of FIG. 5 may be implemented by the call log processor 124 of FIG. 1 using, for example, computer-readable instructions, or any suitable combination of hardware and/or software and may be implemented on the mobile device 102 of FIG. 1. The mobile device 102 waits for a new call log item (block 502). In one example, a new call log item may be a new incoming call, a new outgoing call, a new missed call, or any other suitable call log event.

When a new call log item is detected (block 502), the mobile device 102 determines if the new call log item is a missed call (block 504). Additionally or alternatively, rather than the process of FIG. 5 executing when a new call log item is received, the process of FIG. 5 may be carried out each time the mobile device 102 presents the call log 202 to a user, as shown in FIG. 2.

If the new call log item is not a missed call (block 504), the new call log item is added to the call log (block 506) and the process of FIG. 5 ends. Alternatively, if the new call log item is a missed call (block 504), the mobile device 102 obtains caller information, such as the telephone number from which the call was made and/or the name or identity of the caller, the missed call timestamp, and the missed call terminating number (i.e., the number dialed by the caller that resulted in the missed call) (block 508). Returning briefly to FIG. 4, the missed call timestamp may be the time at which the mobile device 102 obtains the missed call indication 402. As explained below, the missed call terminating number may be used to associate voice messages with incoming calls when multiple voicemail servers are accessed and/or multiple voicemail accounts are present on the mobile device 102. For example, a missed call having a first terminating number would only be associated with a voice message left for the first terminating number (e.g., on the voicemail server associated with the terminating number), and would not be associated with a voice message left for a second terminating number. Accordingly, the missed call terminating number associated with the missed call may be obtained and used as a piece of information to associate voice messages with missed calls.

The mobile device 102 then queries (block 510) a voice message list for messages from the caller for the terminating number. For example, the call log processor 124 of FIG. 1 may query the voicemail client 122 for a listing of messages in visual voicemail that are from either the same telephone number as the new call log item or from the same caller as the new call log item, and also were for the terminating number. Consideration of the terminating number when querying the voice message list filters the voice message list only to voice messages associated with the terminating number (i.e., the terminating number associated with the missed call) and, thus, prevents a voice message for a first terminating number from being associated with a missed call for a second terminating number.

Alternatively, the query (block 510) may be a query that is made to a voicemail server associated with the terminating number of the missed call and the query may be directed to the voice messages on that server that are from the caller. In this manner, the results of the query will only be associated with the terminating number of the missed call and will only list voice messages from the caller that are found on the voicemail server associated with the terminating number. Such a query prevents a voice message for a first terminating number from being associated with a missed call from a second terminating number.

If there are no voice messages from the caller (block 512) the new call log item is added to the call log (block 506). Alternatively, if there are voice messages from the caller (block 512), the mobile device finds the first voice message with a time stamp between the missed call timestamp (e.g., $t_1$) and the time identified by the missed call timestamp (e.g., $t_1$) plus the outgoing message duration (e.g., $t_1$-$t_2$) plus the incoming message duration (e.g., $t_2$-$t_3$) plus latency time (block 514). In one example, latency time may be selected to be five minutes or any other suitable time. Latency time is server-specific and includes the time that it takes the voice mail system to create a visual voicemail message from a voice mail left by the caller 104. In some examples, the latency time may be a constant value on the order of about 2 to 10 seconds. However, the latency time could be learned from few first messages and a comparison between the missed call time and the time when a new visual voicemail message is received.

If no voice messages are found that fall within the timing constraints of block 514 (block 516), the new call log item is added to the call log (block 506). Alternatively, if the voice message falling within the prescribed time frame is found (block 516), the item is added to the call log and an indication of an associated voice message is made (block 518).

Figure 6:
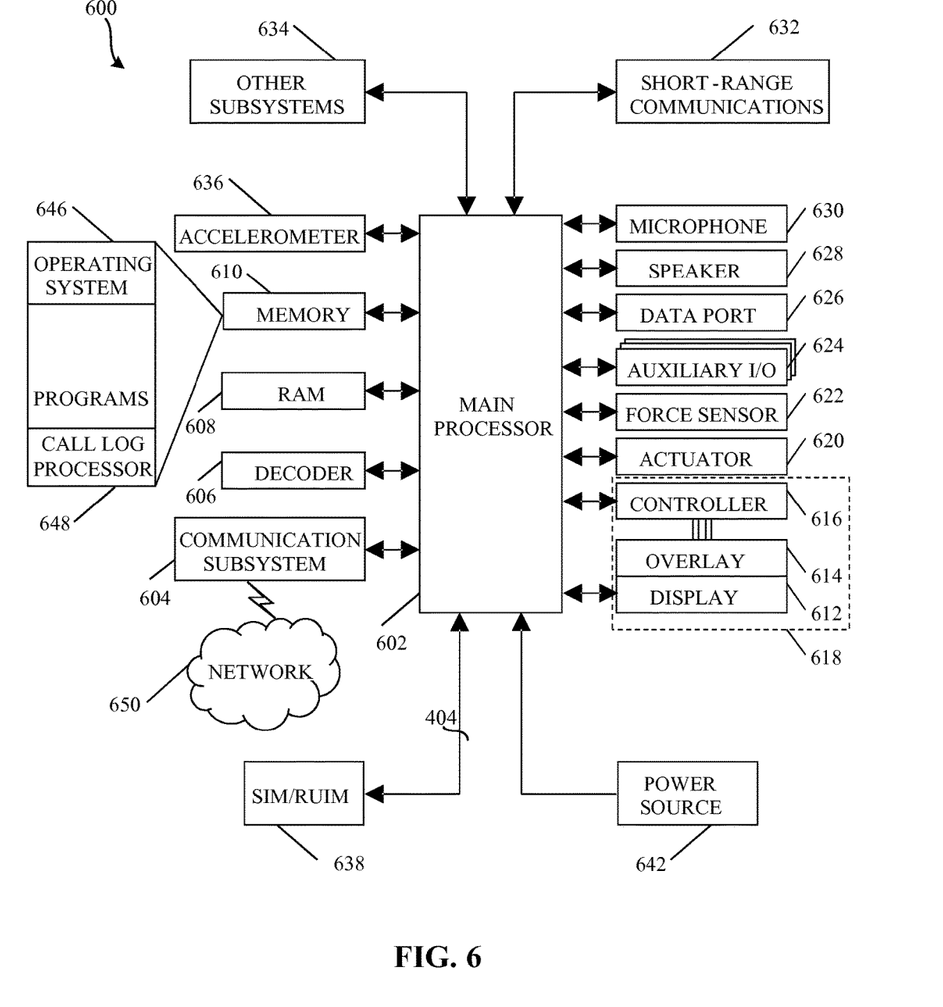
FIG. 6 is a block diagram of a mobile device in accordance with the disclosure.

Further detail of certain aspects of the mobile device 102 of FIG. 1 is shown in FIG. 6 with respect to a mobile, or portable electronic, device 600. The mobile device 600 includes multiple components, such as a processor 602 that controls the overall operation of the mobile device 600. Communication functions, including data and voice communications, are performed through a communication subsystem 604. Data received by the mobile device 600 is decompressed and decrypted by a decoder 606. The communication subsystem 604 receives messages from and sends messages to a wireless network 650. The wireless network 650 may be any type of wireless network, including, but not limited to, data wireless networks, voice wireless networks, and networks that support both voice and data communications. A power source 642, such as one or more rechargeable batteries or a port to an external power supply, powers the mobile device 600.

The processor 602 interacts with other components, such as Random Access Memory (RAM) 608, memory 610, a display 612 with a touch-sensitive overlay 614 operably coupled to an electronic controller 616 that together comprise a touch-sensitive display 618, one or more actuators 620, one or more force sensors 622, an auxiliary input/output (I/O) subsystem 624, a data port 626, a speaker 628, a microphone 630, short-range communications 632, and other device subsystems 634. In one example, the processor 602 and the memory 610 may cooperate to implement the functionality described in conjunction with FIG. 5. For example, tangible and/or non-transitory, and/or machine readable instructions may be stored by the processor 602 and/or the memory 610 to implement the functionality shown in FIG. 5.

Input via a graphical user interface is provided via the touch-sensitive overlay 614. The processor 602 interacts with the touch-sensitive overlay 614 via the electronic controller 616. Information, such as text, characters, symbols, images, icons, and other items that may be displayed or rendered on a mobile device, is displayed on the touch-sensitive display 618 via the processor 602. The processor 602 may interact with an accelerometer 636 that may be utilized to detect direction of gravitational forces or gravity-induced reaction forces.

To identify a subscriber for network access, the mobile device 600 may utilize a Subscriber Identity Module or a Removable User Identity Module (SIM/RUIM) card 638 for communication with a network, such as the wireless network 650. Alternatively, user identification information may be programmed into memory 610.

The mobile device 600 includes an operating system 646 and software programs, applications, or components 648, such as a call log processor, that are executed by the processor 602 and are typically stored in a persistent, updatable store such as the memory 610. Additional applications or programs may be loaded onto the mobile device 600 through the wireless network 650, the auxiliary I/O subsystem 624, the data port 626, the short-range communications subsystem 632, or any other suitable subsystem 634.

A received signal such as a text message, an e-mail message, or web page download is processed by the communication subsystem 604 and input to the processor 602. The processor 602 processes the received signal for output to the display 612 and/or to the auxiliary I/O subsystem 624. A subscriber may generate data items, for example e-mail messages, which may be transmitted over the wireless network 650 through the communication subsystem 604. For voice communications, the overall operation of the mobile device 600 is similar. The speaker 628 outputs audible information converted from electrical signals, and the microphone 630 converts audible information into electrical signals for processing.

As described above example methods, apparatus, and articles of manufacture facilitate operations in a mobile device to associate voice messages with missed calls. The described process of associating voice messages with missed calls allows for presentation of a voicemail indication in a call log. The disclosed process is advantageous because the user may receive more than one missed call from the same person with associated voice messages or without associated voice messages. For example, a caller may receive a busy signal and then hang up, but then call again and if the line is still busy may decide to leave a message. Additionally, a user may receive more than one missed call almost at the same time from unknown numbers. In this case, the method described determines the correct connection between the missed calls and the voice message.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method comprising:
    loading into memory of a mobile device a call log item;
    determining whether or not the call log item relates to a missed call; and
    in response to determining that the call log item relates to a missed call:
        obtaining a caller identity and a call log item time stamp from the call log item, the call log item time stamp comprising a time at which the mobile device obtains a missed call indication;
        locating an incoming voice message associated with the call log item based on a timing constraint being met that includes an evaluation of the call log item time stamp from the call log item, a message duration of an outgoing message, a message duration of the incoming voice message, and a latency time including time required to create a visual voicemail message from the incoming voice message, wherein the latency time is learned from prior message processing and a comparison between the time at which the mobile device obtained the missed call indication and a time when the visual voicemail message is received; and
        adding the call log item to the call log upon locating the incoming voice message based on the timing constraint.

2. The method of claim 1, wherein the incoming voice message associated with the call log item is located further based upon the caller identity.

3. The method of claim 1, further comprising providing a user interface indication in a call log that the incoming voice message is associated with the call log item.

4. The method of claim 1, wherein the incoming voice message associated with the call log item is located further based upon a terminating number of the call log item.

5. The method of claim 1, wherein the latency time is server-specific.

6. The method of claim 1, wherein the latency time is a constant.

7. The method of claim 1, wherein the latency time is preset.

8. A mobile device comprising:
    a housing;
    a display carried by the housing;
    a wireless receiver and transmitter carried by the housing;
    a processor carried by the housing, coupled to the wireless receiver and transmitter, and coupled to the display, the processor configured to:
        load into memory a call log item;
        determine whether or not the call log item relates to a missed call; and
        in response to determining that the call log item relates to a missed call:
            obtain a caller identity and a call log item time stamp from the call log item, the call log item time stamp comprising a time at which the mobile device obtains a missed call indication;
            locate an incoming voice message associated with the call log item based on a timing constraint being met that includes an evaluation of the call log item time stamp from the call log item, a message duration of an outgoing message, a message duration of the incoming voice message, and a latency time including time required to create a visual voicemail message from the incoming voice message, wherein the latency time is learned from prior message processing and a comparison between the time at which the mobile device obtained the missed call indication and a time when the visual voicemail message is received; and
            add the call log item to the call log upon locating the incoming voice message based on the timing constraint.

9. The mobile device of claim 8, wherein the incoming voice message associated with the call log item is located further based upon the caller identity.

10. The mobile device of claim 8, wherein the processor is further configured to provide a user interface indication in a call log that the incoming voice message is associated with the call log item.

11. The mobile device of claim 8, wherein the incoming voice message associated with the call log item is located further based upon a terminating number of the call log item.

12. The method of claim 8, wherein the latency time is server-specific.

13. The method of claim 8, wherein the latency time is a constant.

14. The method of claim 8, wherein the latency time is preset.

15. A non-transitory computer-readable medium having computer-executable instructions for causing a mobile device to perform a method comprising:
    loading into memory of the mobile device a call log item;
    determining whether or not the call log item relates to a missed call; and
    in response to determining that the call log item relates to a missed call:
        obtaining a caller identity and a call log item time stamp from the call log item, the call log item time stamp comprising a time at which the mobile device obtains a missed call indication;
        locating an incoming voice message associated with the call log item based on a timing constraint being met that includes an evaluation of the call log item time stamp from the call log item, a message duration of an outgoing message, a message duration of the incoming voice message, and a latency time including time required to create a visual voicemail message from the incoming voice message, wherein the latency time is learned from prior message processing and a comparison between the time at which the mobile device obtained the missed call indication and a time when the visual voicemail message is received; and
        adding the call log item to the call log upon locating the incoming voice message based on the timing constraint.

* * * * *